(12) United States Patent
Stein et al.

(10) Patent No.: US 10,825,607 B2
(45) Date of Patent: Nov. 3, 2020

(54) SYSTEM AND METHOD FOR INCREASING COUPLING OF AN AXLE ROTARY TRANSFORMER

(71) Applicant: Goodrich Corporation, Charlotte, NC (US)

(72) Inventors: Eric Stein, Phoenix, AZ (US); Perry Leaves, Springboro, OH (US)

(73) Assignee: Goodrich Corporation, Charlotte, NC (US)

( * ) Notice: Subject to any disclaimer, the term of this patent is extended or adjusted under 35 U.S.C. 154(b) by 963 days.

(21) Appl. No.: 15/407,724

(22) Filed: Jan. 17, 2017

(65) Prior Publication Data

US 2017/0125162 A1 May 4, 2017

Related U.S. Application Data

(62) Division of application No. 14/339,185, filed on Jul. 23, 2014, now Pat. No. 9,583,260.

(51) Int. Cl.
*H01F 38/18* (2006.01)
*H02J 50/80* (2016.01)
*H02J 50/12* (2016.01)
*F04D 27/02* (2006.01)
*F01D 17/10* (2006.01)
(Continued)

(52) U.S. Cl.
CPC ............ *H01F 38/18* (2013.01); *B60C 23/00* (2013.01); *F01D 17/105* (2013.01); *F02C 6/08* (2013.01); *F04D 27/023* (2013.01); *F04D 27/0215* (2013.01); *H01F 27/02* (2013.01); *H01F 38/14* (2013.01); *H02J 50/12* (2016.02);
(Continued)

(58) Field of Classification Search
CPC ........... H01F 38/14; H01F 38/18; H01F 27/02
USPC .......................... 336/115, 120–121, 130–136
See application file for complete search history.

(56) References Cited

U.S. PATENT DOCUMENTS 4,075,603 A 2/1978 Snyder et al.
4,631,959 A 12/1986 Motycka
(Continued)

FOREIGN PATENT DOCUMENTS

EP 2136053 12/2009

OTHER PUBLICATIONS

Extended European Search Report dated Dec. 18, 2015 in European Application No. 15177629.1.
(Continued)

*Primary Examiner* — Tszfung J Chan
(74) *Attorney, Agent, or Firm* — Snell & Wilmer L.L.P.

(57) ABSTRACT

Described herein is a system and method to enable a wireless power transmission link system. The wireless power transmission link system may comprise a rotatable axle and an optional telemetry unit interior to the axle. The wireless power transmission link system may comprise a first cup located interior to the telemetry unit and/or the axle. The first cup may comprise a first channel for housing a first wrapped coil. The wireless power transmission link system may comprise a second cup located interior to the telemetry unit and/or axle separated by an air gap from the first cup. The second cup may comprise a second channel for housing a second wrapped coil. The first wrapped coil and the second wrapped coil may be inductively coupled. The first cup and/or the second cup may comprise ferromagnetic material properties.

3 Claims, 3 Drawing Sheets

(51) Int. Cl.
  *F02C 6/08* (2006.01)
  *H04B 5/00* (2006.01)
  *B60C 23/00* (2006.01)
  *H01F 27/02* (2006.01)
  *H01F 38/14* (2006.01)

(52) U.S. Cl.
  CPC ............ *H02J 50/80* (2016.02); *H04B 5/0037* (2013.01); *H04B 5/0093* (2013.01); *F05D 2260/963* (2013.01)

(56) References Cited

U.S. PATENT DOCUMENTS

| | | | | |
|---|---|---|---|---|
| 4,675,638 | A * | 6/1987 | Szabo | H01F 17/043 336/120 |
| 4,945,269 | A | 7/1990 | Kamm | |
| 4,979,587 | A | 12/1990 | Hirt et al. | |
| 5,498,911 | A * | 3/1996 | Bossler | B60R 16/027 307/10.1 |
| 6,072,265 | A | 6/2000 | Grehant | |
| 6,388,548 | B1 * | 5/2002 | Saito | B60R 16/027 336/117 |
| 6,501,361 | B1 * | 12/2002 | Michaels | H01F 38/18 333/24 R |
| 2008/0179132 | A1 | 7/2008 | Hunt et al. | |
| 2009/0192667 | A1 | 7/2009 | Burreson | |
| 2010/0148505 | A1 * | 6/2010 | Dunlap | H01F 38/18 290/44 |
| 2013/0127580 | A1 * | 5/2013 | Dobbs | H01F 30/06 336/84 M |
| 2013/0192860 | A1 | 8/2013 | Puzio | |
| 2013/0340441 | A1 | 12/2013 | Little et al. | |
| 2016/0001663 | A1 * | 1/2016 | Chae | H04B 5/0087 307/9.1 |
| 2016/0027576 | A1 | 1/2016 | Stein | |
| 2019/0226566 | A1 * | 7/2019 | Hillman | B60K 17/16 |

OTHER PUBLICATIONS

Underhill, Solenoids Electromagnets and Electricmagnetic Windings, 223 Illustrations, 1910, New York, pp. 1-388, D. Van Nostrand Company.
USPTO; Pre-Interview First Office Action dated Nov. 3, 2015 in U.S. Appl. No. 14/339,185.
USPTO; First Action Interview Office Action dated Feb. 5, 2016 in U.S. Appl. No. 14/339,185.
USPTO; Final Office Action dated Jul. 1, 2016 in U.S. Appl. No. 14/339,185.
USPTO; Advisory Action dated Sep. 19, 2016 in U.S. Appl. No. 14/339,185.
USPTO; Notice of Allowance dated Dec. 7, 2016 in U.S. Appl. No. 14/339,185.

* cited by examiner

SYSTEM AND METHOD FOR INCREASING COUPLING OF AN AXLE ROTARY TRANSFORMER

CROSS REFERENCE TO RELATED APPLICATION

The present application is a divisional of, and claims priority to, U.S. application Ser. No. 14/339,185 entitled "SYSTEM AND METHOD FOR INCREASING COUPLING OF AN AXLE ROTARY TRANSFORMER" and filed on Jul. 23, 2014, the contents of which are incorporated by reference herein in their entirety.

FIELD OF INVENTION

The present disclosure relates to wireless energy transmission and more specifically to increase the transmission efficiency of a wireless transmission link system.

BACKGROUND

Wireless power or wireless energy transmission is the transmission of electrical energy from a power source to an electrical load without a physical connection. Wireless transmission is useful in cases where interconnecting wires are inconvenient or difficult, such as between two rotating bodies and/or between a stator and a rotor.

SUMMARY

Described herein is a system and method to enable a wireless power transmission link system according to various embodiments. The wireless power transmission link system may comprise a rotatable axle and an optional telemetry unit interior to the axle. The wireless power transmission link system may comprise a first cup located interior to the telemetry unit and/or the axle. The first cup may comprise a first channel for housing a first wrapped coil. The wireless power transmission link system may comprise a second cup located interior to the telemetry unit and/or axle separated by an air gap from the first cup. The second cup may comprise a second channel for housing a second wrapped coil. The first wrapped coil and the second wrapped coil may be inductively coupled. The first cup and/or the second cup may comprise ferromagnetic material properties.

According to various embodiments, a first cup comprising an inner ring and an outer ring oriented concentrically around inner ring separated via a channel is disclosed. The channel may be configured to receive a wrapped coil around the inner ring. The cup may comprise ferromagnetic material properties. The cup is configured for positioning interior to a rotatable axle.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
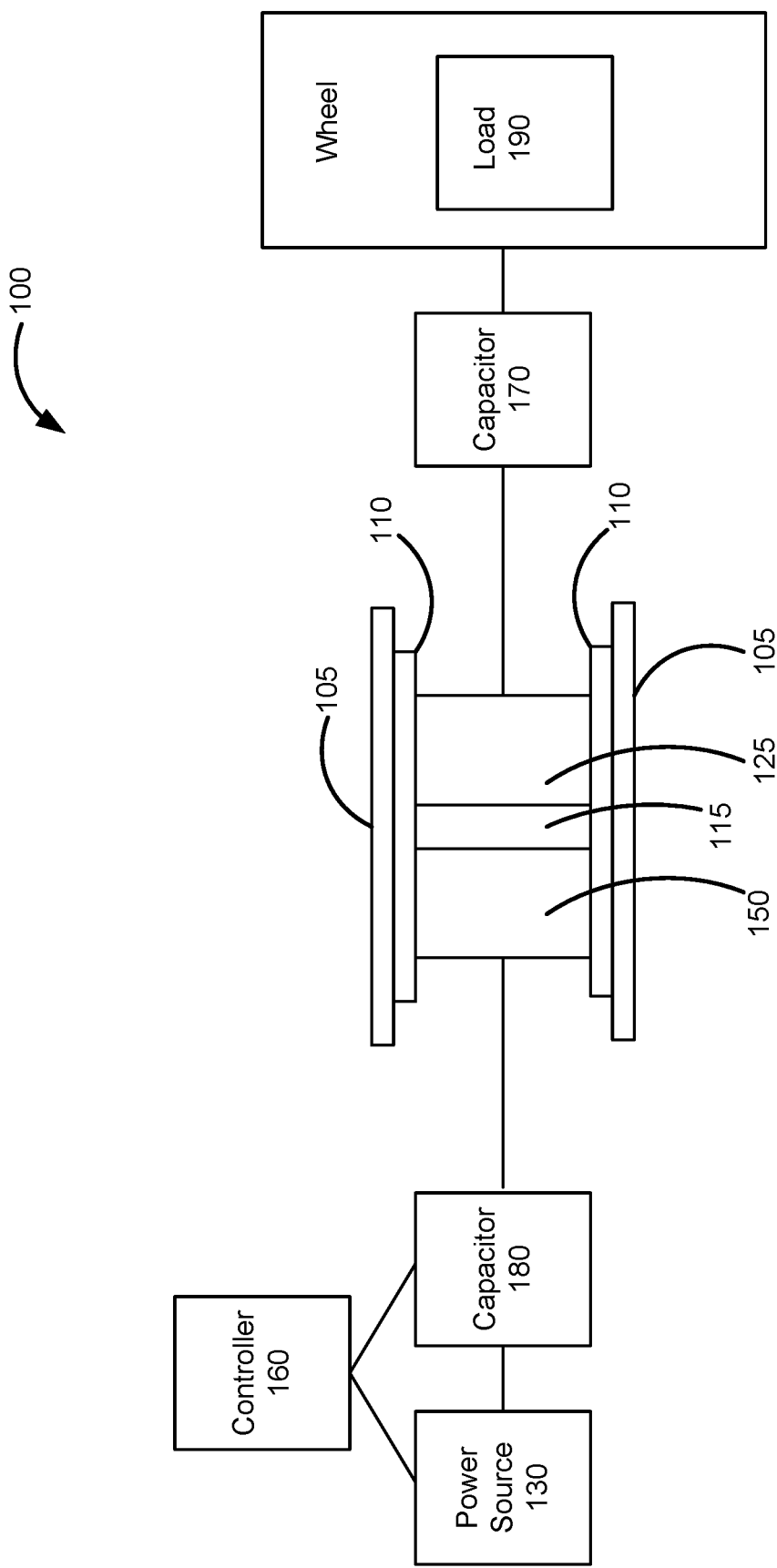
FIG. 1 illustrates, in accordance with various embodiments, a block diagram of a wireless transmission link system.

With reference to FIG. 1 and according to various embodiments, a wireless transmission link system 100 is described herein. Wireless transmission link system 100 is shown, used within the axle 105 of an aircraft tire pressure monitoring system (TPMS). A design constraint of such systems is the amount of electrical energy lost in the form of flux flowing through the metal of the axle 105. For example, the axle 105 may act as a low resistance path for the electrical energy transmitted and the wireless transmission link may short. Electrical energy is the electrical energy carried by moving electrons in an electric conductor. In response, the electrical energy transmitted may be increased such that the minimum amount of electrical energy crossing the air gap 115 can be realized. Historically, a typical solution for this challenge is to input additional electrical energy into the system, which may lead to wasted electrical energy and does not address the problem of how much electrical energy, is lost through available low resistance paths.

According to various embodiments and with continued reference to FIG. 1, a first cup 125 and/or a second cup 150 comprising ferromagnetic material properties, may be incorporated into a wireless transmission link system 100 to increase the transmission efficiency of the wireless transmission link system 100. The first cup 125 and the second cup 150 may be a matched pair of cups. The matched pair of cups (e.g., a first cup 125 and a second cup 150) may be elements of an inductive power and data delivery wireless transmission link system 100. The first cup 125 and the second cup 150 may be positioned in between an axle 105 and wrapped coils 210, 215 (with brief reference to FIG. 2) used for electromagnetic energy transmission and act as a near field high permeability path for electromagnetic energy to travel through before the electromagnetic energy is given a chance to be lost in a low resistance path, such as the axle 105. The coupling of the wrapped coils 210, 215 within the first cup 125 and the second cup 150 determines the transmission efficiency of the wireless transmission link system 100. As the transmission efficiency of the wireless transmission link system 100 is increased, the wireless transmission link system 100 input power from a power source 130 may be decreased. An enclosure, such as a telemetry unit 110, may be configured for coupling the first cup 125 and/or the second cup 150 to the axle 105. The telemetry unit 110 may further be configured to escape electrical connectors coupled to the wrapped coils (e.g., the wrapped coils 210 of the first cup 125 and/or the wrapped coils 215 of the second cup 150) to a connector. Using resonance can help improve efficiency of the wireless transmission link system 100 dramatically. Via a resonant coupling, the wrapped coils 210 of the first cup 125 may be coupled to a capacitor 170 Similarly, the wrapped coils 215 of the second cup 150 may be coupled to a capacitor 180. The capacitive loaded wireless transmission link system 100 may form a tuned inductor/capacitor (LC) circuit. In response to the wrapped coils 210 of the first cup 125 and the wrapped coils 215 of the second cup 150 resonating at a common frequency, significant power may be transmitted between the wrapped coils 210, 215 over an air gap 115 range of multiples of the wrapped coil 210, 215 diameter at an operational efficiency. The wrapped coils 210 of the first cup 125 may be directly or indirectly electrically coupled to a load 190, such as a sensor (e.g., a tire pressure sensor). A controller 160, such as a brake control unit, may command and process the signals of the wireless transmission link system 100.

Figure 2:
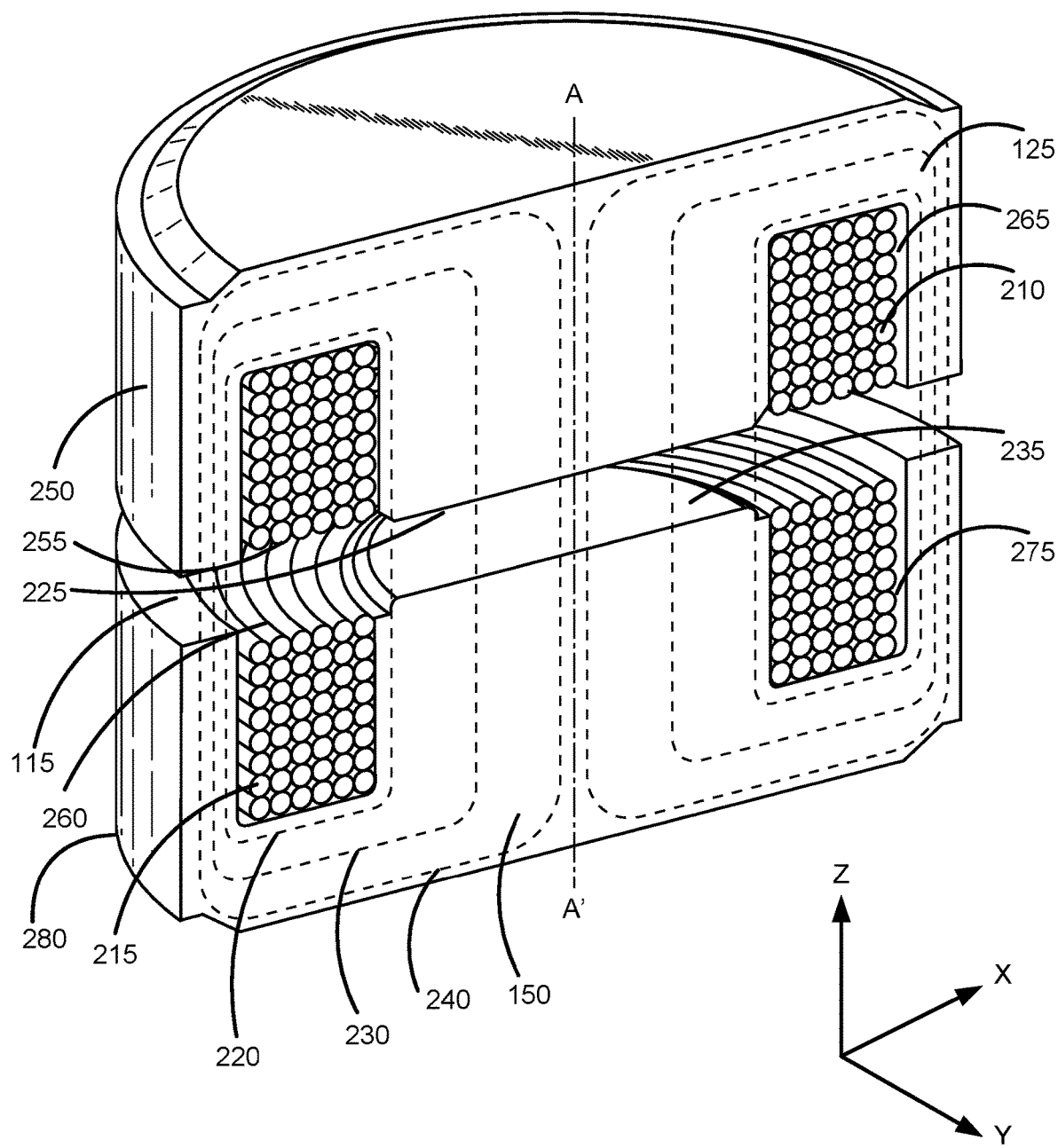
FIG. 2 illustrates, in accordance with various embodiments, an isometric cutaway view of a matched pair of cups of a wireless transmission link system.
Figure 3:
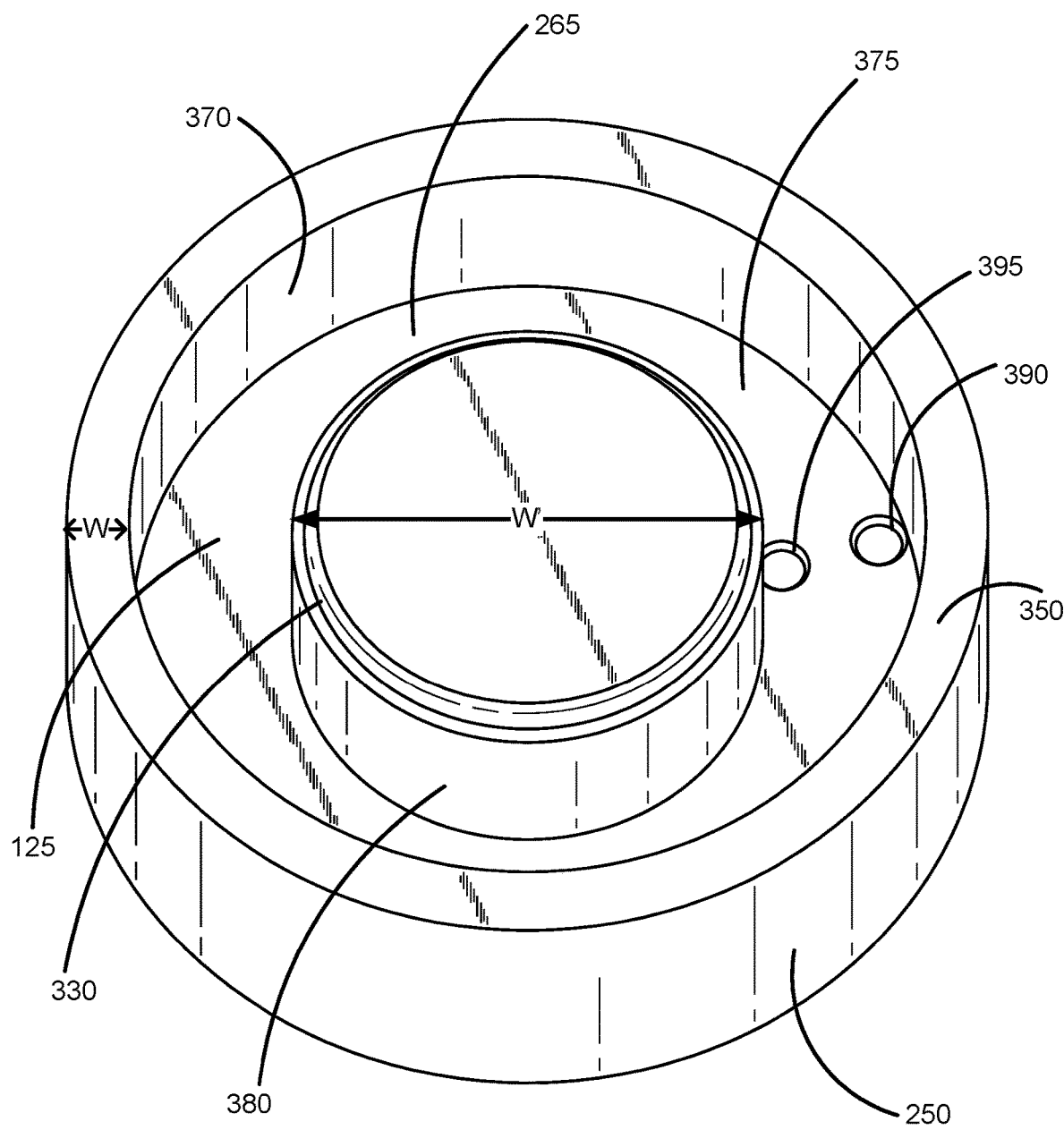
FIG. 3 illustrates, in accordance with various embodiments, an isometric view of a cup of a wireless transmission link system.

According to various embodiments and with reference to FIGS. 2 and 3, the first cup 125 and the second cup 150 are configured to increase the transmission efficiency and to shield and/or reduce electrical energy from being lost in a low resistance path, such as the surrounding axle 105 (not shown in FIGS. 2 and 3). In this way, the wireless transmission link system 100 may be transformed from a loosely coupled pair of inductors to a substantially ideally coupled rotary transformer. Notably, a rotary transformer is a specialized transformer used to couple electrical signals between two parts that rotate in relation to each other. Rotary transformers are constructed by winding the primary and secondary windings into separate halves of a core; these concentric halves face each other, with at least one half mounted to one of the rotating parts. Magnetic flux provides the coupling from one half of the core to the other across an air gap, providing the mutual inductance that couples electrical energy from the transformer's primary winding to its secondary winding. Similarly, in various embodiments of the present wireless transmission link system 100, the wrapped coils 210 of first cup 125 may be operationally analogous to the windings of a primary in a rotatory transformer. The wrapped coils 215 of second cup 150 may be operationally analogous to the windings of a secondary in a rotatory transformer. Flux paths 220, 230 and 240 demonstrate a preferred flux path through the ferromagnetic first cup 125 and second cup 150, as opposed to a path through a surrounding axle 105 and/or telemetry unit 110. In this way, wireless transmission link system 100 may comprise a substantially ideally coupled rotary transformer within the axle 105 of a wheeled vehicle. Stated another way, wireless transmission link system 100 may comprise a substantially ideally coupled rotary transformer interior to the axle 105 of an aircraft wheel configured to power to and transmit signals from rotating elements of the aircraft wheel.

According to various embodiments, first cup 125 may comprise any desired geometric shape. For instance, and with renewed reference to FIGS. 2 and 3, first cup 125 may comprise a cylindrical shape. All or a portion of first cup 125 may comprise ferromagnetic properties. For instance, first cup 125 may comprise a ferromagnetic material, such as a ferrite and/or powdered iron coating. First cup 125 may comprise an inner ring 330 and an outer ring 350. Inner ring 330 and outer ring 350 may be concentric. The gap between inner ring 330 and outer ring 350 may form a channel 265 defined by a circumferential exterior surface 380 of inner ring 330, a bottom surface 375 normal to the circumferential exterior surface 380, and a circumferential interior surface 370 of outer ring 350. The width W of outer ring 350, may be determined to maximize the flux path within outer ring 350. Similarly, the diameter W' of inner ring 330 may be determined to maximize the flux path within inner ring 330. In this way, the location of wrapped coils 210 and/or channel 265 may be at any location between centerline A-A' and the exterior circumferential surface 250 of first cup 125.

The dimensions of channel 265 may be any desired dimensions. Wrapped coils 210 may be stacked and tightly wound within channel 265. The dimensions of channel 265 may be determined to minimize the amount of space between outward facing surfaces of a wrapped coil 210 and surfaces of the channel 265. Through holes 390 and 395 may be configured to escape wrapped coil 210 through the face of bottom surface 375. Stated another way, at least a portion of wrapped coil 210 may travel inside through holes 390 and 395. The channel 265 surfaces may be coated with a ferromagnetic material, such as a ferrite and/or powdered iron coating.

According to various embodiments, second cup 150 may comprise any desired geometric shape. For instance, second cup 150 may mirror the shape of first cup 125. Second cup 150 may comprise a cylindrical cross-sectional shape. All or a portion of second cup 150 may comprise ferromagnetic properties. For instance, second cup 150 may comprise a ferromagnetic material, such as a ferrite and/or powdered iron coating. Second cup 150 may comprise a channel 275 configured to house wrapped coils 215. Wrapped coils 215 may be stacked and tightly wound within channel 275.

Wrapped coils 210, 215 may be secured in position within channels 265, 275 respectively, using a coating, such as a coating of an epoxy. Wrapped coils 210, 215 may be configured to transfer power and data. For instance, data may be transmitted to and from a load 190, such as a sensor, to a controller 160. For instance, according to various embodiments, a controller 160, such as a brake control unit, may interpret and measuring changes in current as data being transmitted from the sensor. A short of the wireless transmission link system 100 may communicate a sensor reading. In this way, an unintended short, as was commonplace in conventional systems, may present a false reading for the controller 160.

Axis A-A' may be the axis of rotation of the axle 105. The axle (not depicted in FIGS. 2 and 3), may substantially surround the exterior circumference of the first cup 125 and the second cup 150. For instance, an exterior circumferential surface 250 of first cup 125 may be coupled to an internal circumferential surface of telemetry unit 110. Similarly, an exterior circumferential surface 280 of the second cup 150 may be coupled to an internal circumferential surface of telemetry unit 110. An exterior circumferential surface of the telemetry unit 110 may be coupled to an internal circumferential surface of axle 105. The distance between the outward surface 255 of wrapped coils 210 and the outward surface 260 of wrapped coils 215 may define the distance of air gap 115. The height of the surface 225 in the Z direction of inner ring 330 of first cup 125 may extend toward the adjacent opposite second cup 150 higher than the outward surface 255 of wrapped coils 210. Similarly, the height of the surface 235 in the Z direction of inner ring 330 of the second cup 150 may extend toward the adjacent opposite first cup 125 higher than the outward surface 260 of wrapped coils 215. This may help to direct flux from wrapped coils 210 to wrapped coils 215. As depicted the flux paths, 220, 230, 240 may be redirected by the first cup 125 and the second cup 150. According to various embodiments, first cup 125 and/or load 190 is internal to a wheel configured to rotate. Wrapped coils 210 and wrapped coils 215 may be aligned in the Z direction. First cup 125 and second cup 150 may share a common center line, such as axis A-A'. The openings of channel 265 and channel 275 may be oriented along parallel planes.

In response to alternating current being applied to wrapped coils 210 in series or parallel connection, the wrapped coils 210 may generate an alternating magnetic flux which moves through the first cup 125 along the flux paths 220, 230, and 240 as depicted in FIG. 2. The complete magnetic path for each pair of wrapped coils 210, 215 includes two air gaps 115. The magnetic lines of force around wrapped coils 215 generate voltage in these windings and alternating current power is then available for use by components secured to axle 105 and which may rotate with axle 105.

First cup 125 and second cup 150 reduces the power to be inputted into the wireless transmission link system 100. Additionally, in response to the wrapped coils 210, 215 being in a highly efficient coupling a resonance frequency may become redundant. As power transmitted is decreased, the heat load the wireless transmission link system 100, such as the heat load in the brake control unit may be reduced.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A cup comprising;
an inner ring including a cylindrical solid post; and
an outer ring oriented concentrically around the inner ring separated via a channel, the outer ring configured to be disposed adjacent to a telemetry unit, wherein:
the channel is configured to receive a wrapped coil around the inner ring,
the cup comprises a ferromagnetic material,
the cup is configured to be positioned interior to a rotatable axle,
the cup is configured to be positioned opposite an adjacent cup,
the adjacent cup is in accordance with the cup,
the cup is configured to rotate relative to the adjacent cup and transmit a signal across an air gap between the cup and the adjacent cup,
the adjacent cup is configured to be positioned interior to a stationary axle, and
the cup and the adjacent cup configured to provide a flux path through the cup and the adjacent cup as opposed to through a path through the rotatable axle.

2. The cup according to claim 1, wherein the cup is an element of an inductive power and data delivery system.

3. The cup according to claim 2, wherein the inductive power and data delivery system is a tire pressure monitoring system.

* * * * *